July 23, 1940.  L. W. LESSLER ET AL  2,208,799
CAMERA CONSTRUCTION
Filed March 18, 1939  2 Sheets-Sheet 1

INVENTORS
LEW W. LESSLER
JOHN KENNETH POLHEMUS
by Philip S. Hopkins
ATTORNEY.

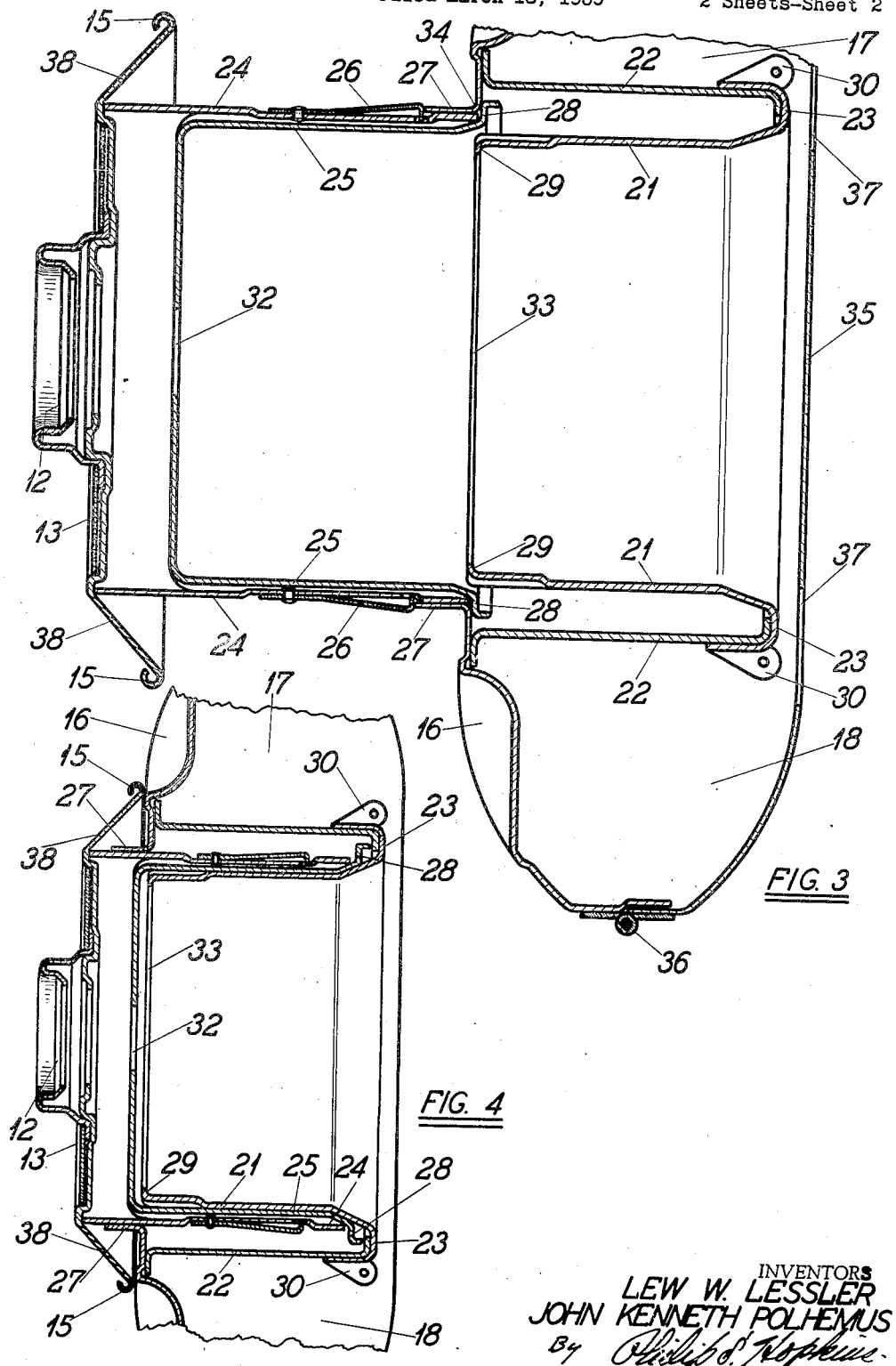

Patented July 23, 1940

2,208,799

UNITED STATES PATENT OFFICE 2,208,799

CAMERA CONSTRUCTION

Lew W. Lessler, Johnson City, and John Kenneth Polhemus, Binghamton, N. Y., assignors, by mesne assignments, to General Aniline & Film Corporation, New York, N. Y., a corporation of Delaware Application March 18, 1939, Serial No. 262,714

2 Claims. (Cl. 95—39)

Our invention relates to a form of construction for cameras. More particularly, the invention relates to an improved camera having folding or telescoping parts wherein the probability of light leakage is reduced to a minimum.

It has been cutomary to construct cameras comprising a body portion and a lens carrying member so inter-connected that the lens carrying member may be folded or compressed into the camera body for compactness and ease of carrying while at the same time being extendable to a desired operative position for the actual taking of pictures. One form of construction adapted to this purpose is the provision of a slidable casing member to which the lens is attached, and which is adapted to slide in and out of the body portion of the camera. The old forms of construction made use of a single shell in the camera body, generally lined with felt or other light-excluaing material, and within which the casing member was slidable. One disadvantage of this form of construction was its susceptibility to light leakage through the space between the shell portion and the casing member holding the lens.

With this disadvantage of the prior art in view, one object of the invention is to provide an improved form of construction for such a camera. Another object is to eliminate the possibility of light leakage. Still another object is to provide a construction which will at the same time be compact and economical. A further object is to provide, in combination with our improved construction, improved focal plane supporting means for the light sensitive film. Other objects and advantages will appear from the following specification.

Figure 1:
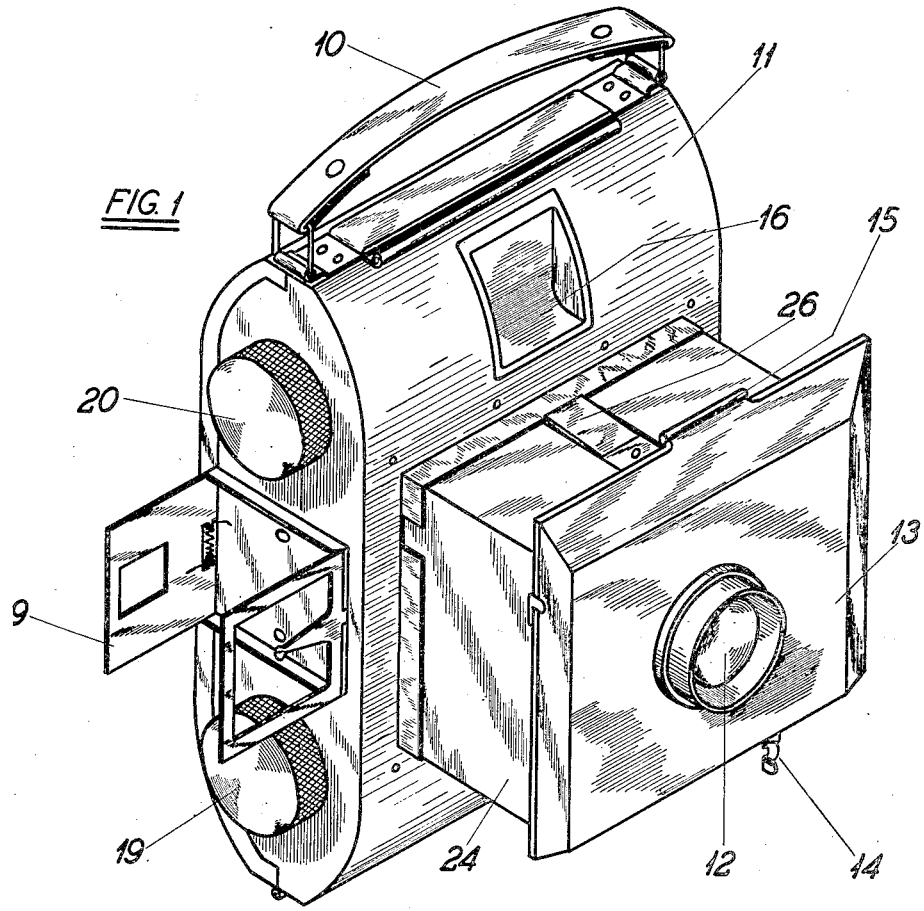
Figure 2:
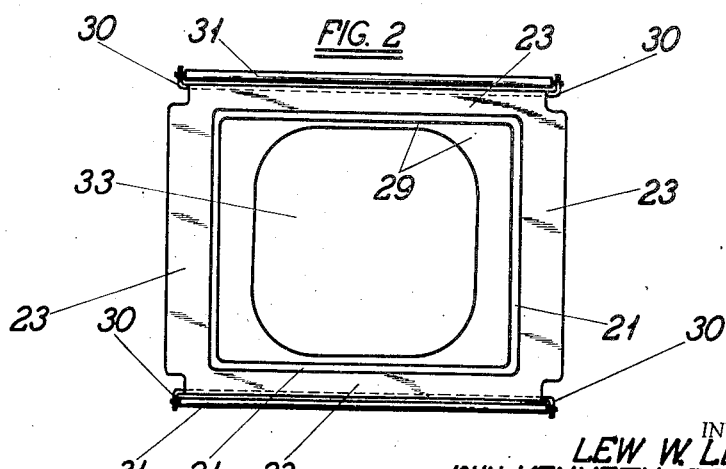

Our invention accordingly comprises the construction and arrangement, one form of which is exemplified in the accompanying drawings forming a part of this application, wherein Fig. 1 is a perspective view of a complete camera embodying one form of our invention; Fig. 2 is a rear view of the focal plane portion of such a camera; Fig. 3 is a sectional partial side view of such a camera in its open or unfolded position, and Fig. 4 is a similar sectional partial side view showing the camera in its closed or folded position.

In order that those skilled in the art may better understand the nature and scope of our invention we now give a detailed description thereof with particular reference to the drawings, wherein like reference characters indicate like parts.

Our invention may be used in a camera as in Fig. 1, which comprises a camera body 11 provided with the usual carrying handle 10 and viewfinder 9, and a lens 12 mounted on a lens carrying member 13. On this lens carrying member 13 may also be mounted any suitable shutter arrangement (not shown) actuated by a release lever 14. Secured to the lens carrying member 13 is the casing member 24 which in this form has a rectangular or boxlike shape. It will be understood that this casing member 24 might be made in any other desired shape, as, for instance, a cylindrical or elliptical section or the like.

This casing member 24 is adapted to slide within a double-walled shell in the body portion of the camera (see Fig. 3). This double-walled shell is formed from an inner shell 21 and an outer shell 22, the space between the shells being left open on the lens side of the camera to permit the casing member 24 to be slidably mounted therein. The two shells 21 and 22 extend back through the camera to the focal plane 23—23 thereof where they are overlappingly joined to each other as at 23. This joint 23 is preferably flattened somewhat, and thus forms a smooth, flat exposure frame (see also Fig. 2) in the focal plane of the camera against which a light sensitive film may be held. In order to further facilitate the movement of film within the camera this double-walled shell may be provided with supporting frames 30 between which are mounted rollers 31 over which the film may pass. The camera is customarily provided with film spool chambers 17 and 18 in one of which the supply spool is placed and in the other of which the takeup spool is held, and from one to the other of which the film may be moved by means of suitable external knobs 19 and 20 co-operating with the film spools. The film will be held flat between the focal plane supporting surfaces 23 and the camera back 35, which may be hinged as at 36 and provided with peep holes 37 in known manner. It will be seen that our form of construction not only provides a light tight mounting within which the casing may slide, but also separates the storage chambers for the film spools and provides a useful method of support for the film in the focal plane of the camera.

The inner shell 21 of the body portion may be provided with inwardly disposed flanges 29 (Fig. 2) to secure any desired size of opening 33 between the lens and the focal plane.

In the preferred form of our invention the camera body is provided with an outwardly disposed rim or flange 27 which closely conforms to the shape of the casing member 24 which is slidable therein and guided thereby. The casing member 24 is cut out to provide it with spring locking means 26 adapted to catch on the flange 27 to hold the casing member 24 in its outward or unfolded position. These locking means 26 may be disengaged from the flange 27 by pressure of the fingers when it is desired to close the camera. For convenience in opening the camera the lens carrying member 13 or the casing member 24 may be provided with projecting finger pieces 15. The camera body 11 may have disposed therein similarly placed recesses 16 to facilitate grasping the finger pieces 15, as described and claimed in application Serial Number 175,310 of Bornmann and Lessler, filed November 18, 1937.

In the preferred form of construction shown in the drawings we have provided the casing member 24 with an inner lining member 25 which in turn may be provided with an opening 32 of the proper size to permit the light rays entering through the lens to cover the field of the film at the focal plane 23—23. The purpose of this inner lining is to further insure the exclusion of light, particularly where the casing member itself has openings therein, as in providing the spring locking means 26. This inner shell 25 is suitably rigidly connected with the casing 24 and may be provided with a flange 28 at its inner end adapted to overlie the sliding joint between the casing 24 and the flange 27 when the camera is in its open position (see Fig. 3). This flange 28 thus acts as an added safeguard against the entry of light into the camera body and, by engaging with the inner edge or sholuder 34 of the flange 27, acts as a limit to the outward movement of the casing 24, and defines the proper operating position of the lens for its particular focal length.

The casing 24 or lens carrying member 13 may also be provided with a suitable flange 38, adapted to overlie the joint between the casing 24 and flange 27, thus making it more difficult for light rays to penetrate this sliding joint (see Figs. 3 and 4).

To further explain the advantageous light-excluding qualities of our invention we wish to point out that if any light should happen to leak in at the edge of the flange 27 or around the spring locking means 26, when the camera is in an open position, such light would have to travel between the flange 27 and casing 24 around the corner 34, out around the flange 28 and finally in around the flange 29 to reach the inner chamber of the camera. Or on the other hand, the light coming in around the spring locking means 26 would have to pass between the casing 24 and the shell 25 to the front of the camera, and then around the opening 32 into the camera chamber. Because of the close fit of all these integral and sliding members the probability of such light leakage is greatly reduced. Furthermore, it will be seen that it is practically impossible for any light leaking in at the flange 27 to penetrate to the film chambers 17 or 18 by reason of the particular construction adopted here.

Similarly, when the camera is in its closed or folded position any light which might leak in around the flange 27 would have to travel back into the camera between the outer shell 22 and the casing 24 and then forward again between the casing 24 and the inner shell 21 before finally rounding the flange 29 and penetrating the interior of the camera.

It will be seen from the foregoing description that our preferred form of construction not only provides a light tight folding camera but also provides in combination therewith an improved focal plane supporting member for the light sensitive film. We do not desire to limit ourselves to the precise form of construction shown here, since many alternative and equivalent forms of construction, which will be readily apparent to those skilled in the art, are embraced within the conception and scope of our invention.

We claim:

1. In a camera comprising a body portion and a lens, the combination of a double-walled shell in said body portion surrounding the optical axis of the camera, the walls of said shell being sealed at their inner ends to form a light lock and supporting surface in the focal plane of the camera against which a light sensitive film may be held, and a casing member holding the lens and adapted to slide along the optical axis of the camera between the walls of said shell, one wall of said shell having a projecting shoulder on the lens side of the camera, and the casing member having at its inner end a projecting flange adapted to cooperate with the shell shoulder to limit the outward movement of the casing member and act as a protection against the entry of light, and said casing member also having at its outer end a projecting flaring flange adapted to prevent light from penetrating into the camera along the casing.

2. In a camera comprising a body portion and a lens, the combination of a double-walled shell in said body portion surrounding the optical axis of the camera, the walls of said shell being sealed at their inner ends to form a light lock and film-supporting surface in the focal plane of the camera, and one wall of said shell having a projecting shoulder on the lens side of the camera, and a casing member holding the lens and adapted to slide along the optical axis of the camera between the walls of said shell, said casing member being provided with an inner lining member having at its interior end a projecting flange adapted to cooperate with the shell wall shoulder to limit the outward movement of the casing member and act as a protection against the entry of light, said inner lining member being further provided adjacent the lens with an opening of desired size to determine the maximum amount of light passing from the lens to the focal plane.

LEW W. LESSLER.
JOHN KENNETH POLHEMUS.